United States Patent
Lubbers et al.

[11] Patent Number: 6,161,192
[45] Date of Patent: *Dec. 12, 2000

[54] RAID ARRAY DATA STORAGE SYSTEM WITH STORAGE DEVICE CONSISTENCY BITS AND RAIDSET CONSISTENCY BITS

[75] Inventors: Clark E. Lubbers, Colorado Springs; Stephen J. Sicola, Monument; Ronald H. McLean, Elbert; James Perry Jackson, Colorado Springs; Robert A. Ellis, Woodland Park, all of Colo.

[73] Assignee: Compaq Computer Corporation, Maynard, Mass.

[*] Notice: This patent is subject to a terminal disclaimer.

[21] Appl. No.: 08/542,827

[22] Filed: Oct. 13, 1995

[51] Int. Cl.$^7$ ....................................................... G06F 11/16
[52] U.S. Cl. .................................. 714/6; 714/5; 711/114
[58] Field of Search ......................... 395/182.04, 182.05, 395/182.03, 441; 371/40.4; 711/114, 162

[56] References Cited

U.S. PATENT DOCUMENTS

| | | | |
|---|---|---|---|
| 5,233,618 | 8/1993 | Glider et al. ................................. | 714/6 |
| 5,469,453 | 11/1995 | Glider et al. ................................. | 714/6 |
| 5,504,858 | 4/1996 | Ellis et al. .................................... | 714/6 |
| 5,537,567 | 7/1996 | Galbraith et al. ........................ | 711/114 |
| 5,579,516 | 11/1996 | Van Maren et al. ......................... | 701/1 |

*Primary Examiner*—B. James Peikari
*Attorney, Agent, or Firm*—William J. Kubida; A Sidney Johnston; Hogan & Hartson LLP

[57] ABSTRACT

Metadata described herein on a RAID array includes both device metadata and RAIDset metadata. The device metadata has a device FE bit on each storage device corresponding to each RAID protected block on the storage device. The device FE bit indicates if a corresponding RAID protected block is consistent and thereby useable to regenerate data in another RAID protected block in the corresponding RAID protected block's sliver. The user data also has a forced error bit to indicate if a physical block in the user block has inconsistent data, the RAIDset FE bit. The RAID array of storage devices has user data blocks on each storage device RAID protected by being distributed as slivers of blocks across the RAID array of storage devices. Each sliver has a plurality of user data blocks and one parity block. The RAIDset metadata has the RAIDset FE bit corresponding to each RAID protected user data block in the RAID array. The RAIDset FE bit indicates whether or not a corresponding RAID protected user data block contains true data. In addition, FE Dir bits corresponding to each block of FE bits for the device or the RAIDset are added to the metadata. Further the device FE bits, the RAIDset FE bits, the device FE Dir bits and the RAIDset FE Dir bits are in RAID protected blocks in a RAIDset sliver having RAIDset FE bit blocks, RAIDset FE Dir blocks, and a parity block.

20 Claims, 10 Drawing Sheets

RAID ARRAY DATA STORAGE SYSTEM WITH STORAGE DEVICE CONSISTENCY BITS AND RAIDSET CONSISTENCY BITS

CROSS-REFERENCE TO RELATED APPLICATIONS

The present application is related to commonly-assigned patent application entitled RECONSTRUCTING DATA BLOCKS IN A RAID ARRAY DATA STORAGE SYSTEM HAVING STORAGE DEVICE METADATA AND RAIDSET METADATA, U.S. patent application Ser. No. 08/542,670 filed Oct. 13, 1995, and patent application entitled PROMOTING DEVICE LEVEL ERROR TO RAIDSET LEVEL ERROR TO RESTORE REDUNDANCY IN A RAID ARRAY DATA STORAGE SYSTEM, Attorney Docket No. U.S. patent application Ser. No. 08/542,933 filed Oct. 13, 1995 the disclosures of both applications are hereby specifically incorporated by this reference.

BACKGROUND OF THE INVENTION

1. Field of the Invention

This invention relates to a RAID (Redundant Array of Independent Disks) array, data storage system having a storage format that includes device metadata on each storage device in the array and RAID protected RAIDset metadata distributed across the storage devices in the RAID array. More particularly, the invention relates to achieving RAID sliver consistency and user data trustworthiness through the format of RAIDset metadata and device metadata.

2. Description of Related Art

In data processing systems, there has been and continues to be an ongoing evolution in increasing the reliability of user data stored on data storage subsystems used by the data processing system. For some time, Digital Equipment Corporation has provided on each of the SCSI disk drives in its storage subsystems a flag bit for each block (512 8-bit bytes or 4096 bits) of data recorded on the disk drive. This flag bit is named the forced error bit or FE bit. Each user data block on the drive has a corresponding FE bit stored on the disk drive. If the FE bit is set to one, it indicates the user data in the block associated with the FE bit is not trustworthy. In other words, the data can be read but, for whatever reason, the data is corrupt and can not be trusted. U.S. Pat. No. 4,434,487 illustrates generation and use of the FE bit.

As is readily appreciated by those skilled in the data processing art, the FE bit is very useful as it enables the system to read a data block and to use the data even though it is known that the data is not trustworthy. For example, if the data were video or text data, it could still be very useful to display or print the video or text even though some information is missing in the video or text. On the other hand, if the corrupted data represents numerical information, the data may not be useful at all.

Another technique for adding to the reliability of stored user data is the distribution of user data across multiple storage devices in a RAID array of storage devices. The purpose of a RAID array is to provide redundancy so that user data may be regenerated when individual blocks of data are bad or are lost. For example, in a RAID array having five storage devices or members, user data is recorded in four blocks, each of these four blocks is recorded on a separate storage device, i.e. disk drive. In addition, a fifth drive or member is added to the RAID array in order to store a parity block for the other four blocks. The four user data blocks and their parity block are said to form a sliver across the members of the RAID array.

The parity block is created by exclusive ORing the user data blocks. The nth bit of the parity block is the exclusive OR (XOR) of the nth bit of each data block in the sliver. If any one of the user data blocks or the parity block is bad, the bad block may be reconstructed by bitwise XORing the remaining blocks in the sliver. When the parity block contains the bitwise XOR of the data blocks in the sliver, the sliver is said to be consistent. Consistency in a RAID array is typically tracked by storing in the controller an indication of which slivers in the RAID array are redundant. A complete description of the RAID disk array technology may be found in *The RAID Book, a Source Book for Disk Array Technology*, Fourth Edition, edited by Paul Massiglia and published by the RAID Advisory Board, St. Peter, Minn., Sep. 1, 1994, copyright 1994 RAID Advisory Board, Incorporated.

SUMMARY OF THE INVENTION

It is an object of this invention to provide metadata in a RAID array where the metadata indicates whether data blocks in the array are trustworthy or corrupted and also indicates whether each block in each RAID protected sliver of blocks of the RAID array may be used or may not be used to provide redundancy for its sliver of blocks in the array.

In accordance with this invention, the metadata on the array includes both device metadata and RAIDset metadata. The RAID array of storage devices has user data blocks on each storage device, and the user data blocks are RAID protected by being distributed as a sliver or sliver of blocks across the RAID array of storage devices. Each sliver has a plurality of user data blocks and one parity block. The device metadata has a device FE bit on each storage device corresponding to each RAID protected block on the storage device. The device FE bit indicates if a corresponding RAID protected block is consistent and thereby useable to regenerate data in another RAID protected block in the corresponding RAID protected block's sliver. The RAIDset metadata has a RAIDset FE bit corresponding to each RAID protected user data block in the RAID array. The RAIDset FE bit indicates whether or not a corresponding RAID protected user data block contains true or valid data.

As a further feature of the invention, the RAIDset FE bits are in RAID protected blocks in at least one RAIDset sliver having RAIDset FE bit blocks and a parity block.

As another feature of the invention, a device FE Dir bit corresponding to each block of device FE bits is added to the metadata. The device FE Dir bit indicates if any device FE bit in a corresponding block of device FE bits is set to a state that indicates a RAID protected block is inconsistent. Also RAIDset FE Dir bits may be added to the metadata. Each RAIDset FE Dir bits corresponds to each block of RAIDset FE bits, said RAIDset FE Dir bit indicates if any RAIDset FE bit in a corresponding block of RAIDset FE bits is set to a state that indicates a RAID protected user data block does not have valid data.

In another feature of the invention said RAIDset FE Dir bits are in RAID protected blocks in at least one RAIDset sliver. This RAIDset sliver has RAIDset FE bit blocks, RAIDset FE Dir bit blocks, and a parity block.

The great utility of this invention is that it provides both an indication of valid data in data blocks and the useability of data blocks to reconstruct other data blocks. Each of these indicators is separately useable or useable together to reconstruct data blocks, to verify the validity of data in data blocks as appropriate. For example it is useful to provide consistency between blocks in a sliver whether or not all blocks in the sliver contain valid data.

The foregoing and other objects, features and advantages of the invention will be apparent from the following more particular description of preferred embodiments of the invention as illustrated in the accompany drawings.

DETAILED DESCRIPTION

Figure 1:
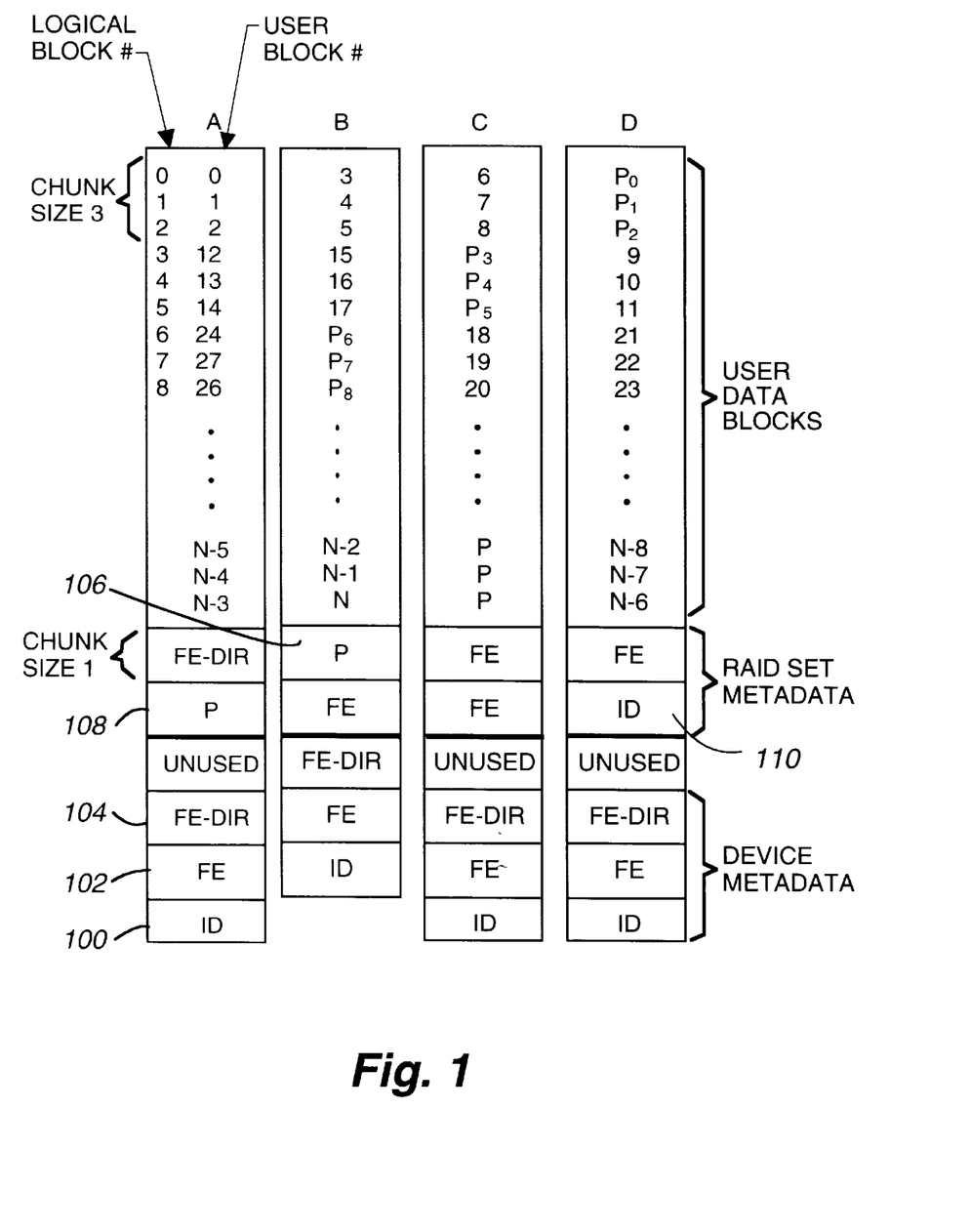
FIG. 1 shows a four disk RAID array with RAIDset metadata and device metadata in accordance with a preferred embodiment of the invention.

In FIG. 1, the physical locations of RAIDed (or RAID protected) user data, RAIDed metadata and device metadata are illustrated in accordance with a preferred embodiment of the invention. In the simple example of FIG. 1, the RAID array includes four disk drives, drives A, B, C, and D. As indicated in FIG. 1, the storage capacity of the drives is split between user data blocks, RAIDset metadata, and device metadata.

Drives A, B, C, and D need not be of the same size. If they are not the same size as depicted in FIG. 1, there is unused storage space in the larger drives. This unused space is located between the highest numbered block of the RAIDset metadata and the lowest numbered block of the device metadata.

Both the user data blocks and the RAIDset metadata are RAID protected data. As indicated for the user data blocks, three data blocks, one from each of the disk drives is associated with a parity block in the fourth disk drive. The parity block is written based on the exclusive OR summation of its associated user data blocks. For example, parity block P1 is the result of exclusive ORing user block 1, user block 4 and user block 7. In Boolean notation, this is represented by P1=1⊕4⊕7.

The user data blocks are accessed in chunk sizes of three blocks. For example, user blocks 12, 13 and 14 are read from disk drive A, while user blocks 15, 16, and 17 are read from drive B and blocks 9, 10, and 11 are read from drive D. At the same time, parity blocks P3, P4, and P5 are read from drive C. User blocks 9, 12 and 15 with parity block P3 constitute a sliver and are said to be RAID protected or RAIDed.

With regard to the metadata, the device metadata is recorded in the last few logical blocks of each device, i.e. disk drive. The last block in the device metadata is the ID block. In drive A, for example, the device metadata identifies the disk drive, the RAID array, the disk drive members of the RAID array (in this case drives A, B, C, and D) and other operative information regarding the disk drive A. In the data space just preceding the ID block in drive A, device FE bits for the logical blocks in drive A are written.

Logical blocks are numbered by disk drive. In drive A, the user data blocks are 0, 1, 2, 12, 13, 14, 24, 25, 26, etc. The same blocks as logical blocks in drive A are numbered 0–8. Accordingly, user data block 14 in drive A would be logical block 5 in drive A. Similarly, although not indicated in FIG. 1, user data block 17 in drive B would correspond to logical block 5 in drive B.

The device FE bits recorded in space 102 of drive A indicate the useability of logical blocks in drive A to reconstruct data in a bad block in the same RAIDed sliver. In other words, each device FE bit indicates the consistency of its corresponding data block relative to other data blocks in the same sliver of the RAID array. If a device FE bit is set to "1," the corresponding logical block data is said to be non-redundant or inconsistent. This means that block cannot be used with the other blocks in the RAID sliver to reconstruct data in one of the other blocks. If the device FE bit is "0," the corresponding logical block is said to be clear. In this case, the data in the logical block may be used to reconstruct data in other blocks in the same RAID sliver. For example, if the device FE bit for logical block 5 in drive A is set to 1, the user data in user block 14 is not redundant or is inconsistent. The user data in block 14 cannot be used to reconstruct data in user blocks 11 or 17 or parity block P5. If the device FE bit for logical block 5 is 0, then the data in logical block 5 or user block 14 is consistent and may be used to reconstruct data in one of the blocks 11, 17 or P5.

The device FE Dir bits in space 104 of drive A are used to provide a fast lookup of the condition of the device FE bits in space 102. There is one device FE Dir bit in space 104 for each block of device FE bits in space 102. A device FE Dir bit is set to 1 if any device FE bit in its corresponding block in the FE space 102 is set to 1. Accordingly, a device FE Dir bit set to 0 indicates that all device FE bits in its FE bit block are clear. Conversely, if a device FE Dir bit is set to 1, at least one of the device FE bits in the corresponding FE bit block is set to 1.

Each of the disk drives B, C, and D contain corresponding information for their drive in corresponding ID blocks, device FE bit space and device FE Dir bit space. This data is referred to as the device metadata.

The RAIDset metadata provides information about the RAIDed, or RAID protected, user data blocks in the entire virtual set of user data blocks. It is not limited to each drive as was the device metadata described immediately above. Virtual set refers to the user data blocks (but not the parity blocks) distributed across the drives A–D in the RAID array. In other words, in the example in FIG. 1, the virtual set consists of user data blocks O–N. To a host CPU using the RAID array a virtual set looks like a virtual disk drive having O–N data blocks.

The RAIDset metadata adds to this virtual drive the same metadata structure as used for the device metadata in the actual drives. In other words, the RAIDset metadata includes an ID block for the virtual set of data blocks, multiple blocks of FE bits, and an FE Dir block. Further, the RAIDset metadata is included in the RAID protected region of the disk drives, and therefore parity blocks 106 and 108 are provided for RAID protection of the RAIDset metadata. The ID block 110 identifies the virtual set of blocks and the members (disk drives) of the RAIDset. The FE bit space contains an FE bit for each user block in the virtual set. Each FE bit is set to 1 to indicate that its corresponding user block contains data that is not trustworthy. In other words, if the FE bit for user block 25 is set to 1, then user block 25 in disk drive A may be read, but the data is corrupted and may not be trusted. If the FE bit in the RAIDset metadata is set to 0, then the corresponding user block contains true, or valid, data, i.e., data that may be trusted.

Just as with device metadata, the RAIDset metadata also has one or more FE Dir blocks. In the FE Dir block, each bit corresponds to a block of FE bits in the FE bit space. The FE Dir bit is set to 1 to indicate that its corresponding FE bit block has at least one bit set to 1. If the FE Dir bit in the RAIDset metadata is set to 0, then the corresponding FE bit block in the RAIDset metadata contains all zeros.

Figure 2:
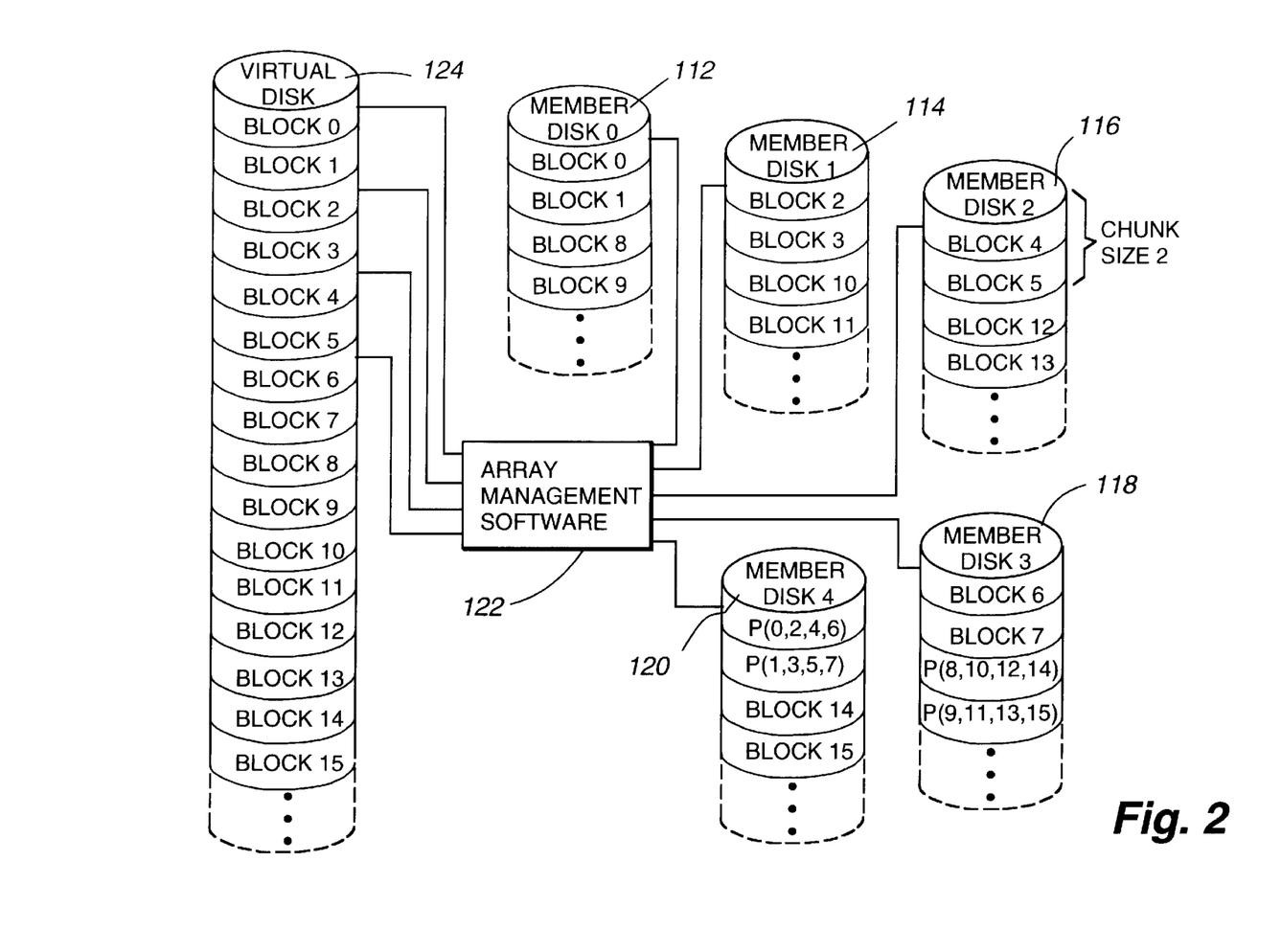
FIG. 2 illustrates the relationship between actual disk drives of a RAID array, RAID array management software and the virtual disk drive simulated by the RAID array.

In FIG. 2, a RAID level 5 relationship between actual member disk drives and the equivalent virtual disk drive is illustrated. There are five actual disk drives: 112, 114, 116, 118 and 120. The RAID array management software 122 manages the distributed user data blocks and parity blocks on drives 112, 114, 116, 118, and 120 so that as a virtual set the user data blocks appear as illustrated on virtual disk drive 124. The RAID system in FIG. 2 differs from that depicted in FIG. 1 in that there are five actual disk drives in FIG. 2, while there are four in FIG. 1. Also, the chunk size for the user data blocks is 3 blocks high in FIG. 1, while it is 2 blocks high in FIG. 2. The device metadata and RAIDset metadata are not shown in FIG. 2.

Figure 3:
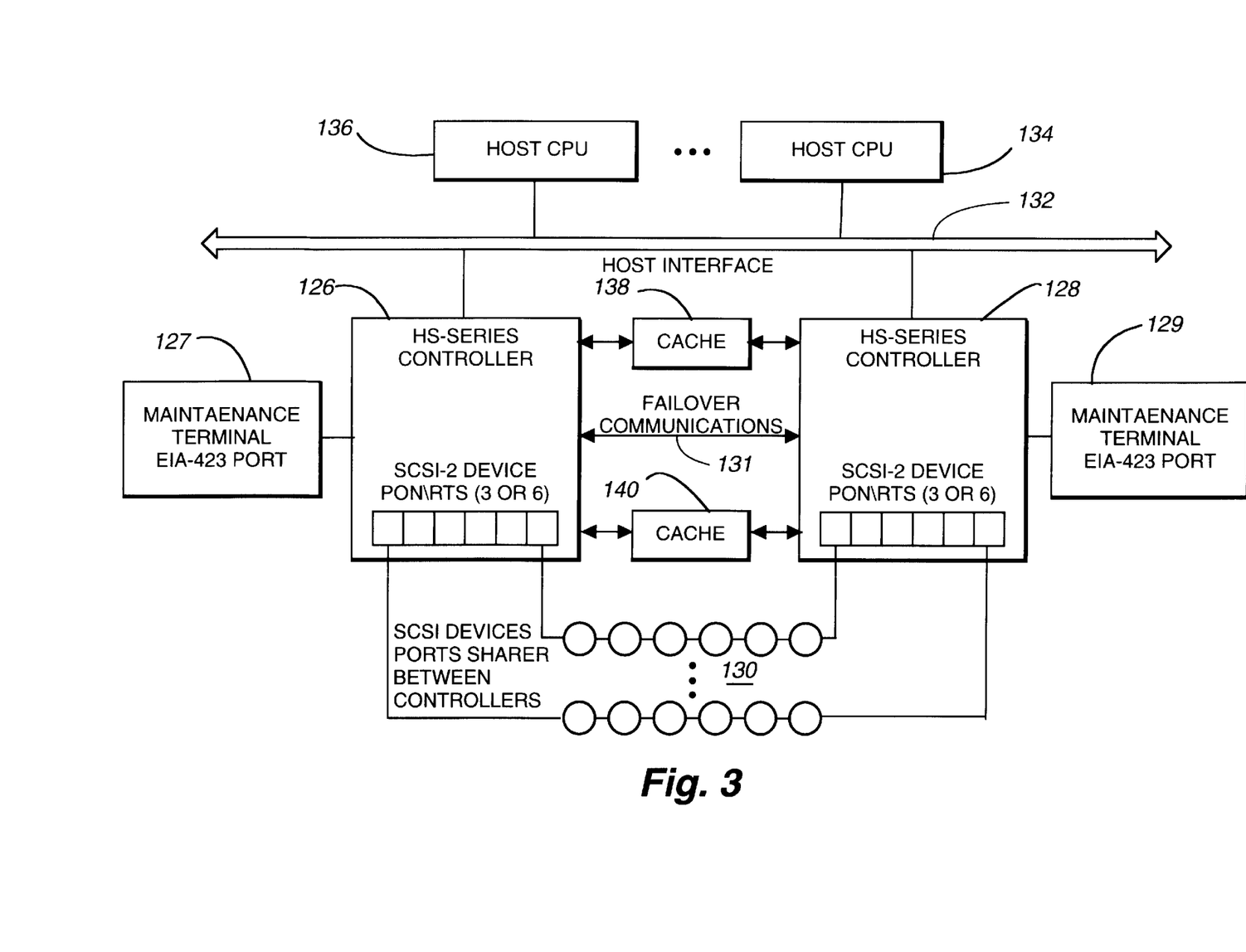
FIG. 3 illustrates a data processing system having redundant RAID array controllers for running RAID array management software.

The array management software runs on the controllers in the data processing system shown in FIG. 3. FIG. 3 illustrates a redundant controller RAID system connected to a host interface with a plurality of host CPUs. Array controller 126 and array controller 128 each are connected to up to six SCSI device ports 130. The members (disk drives) of the RAID array are connected to the ports. The controllers also connect to the host interface 132 and thereby to host CPUs 134 and 136. Controllers 126 and 128 also share cache memory 138 and 140.

Controllers 126 and 128 each include a processor with program storage and working storage for effectively creating the appearance of a virtual disk such as 124 in FIG. 2 from the actual disk drives connected to ports 130. The array management is transparent to host CPU 134 and host CPU 136. As to these host CPUs, it appears as if they have access to a virtual disk drive such as disk drive 124 in FIG. 2. The maintenance terminal ports 127 and 129 provide programmable and test access to the processors in the controllers 126 and 128 respectively. The failover communication link 131 provides communication for handoff control to one controller when the other controller fails. A more detailed discussion of RAID array controllers appears in the article entitled "The Architecture and Design of HS-Series Storage Works Array Controllers" by Stephen J. Sicola in the Digital Technical Journal, Vol. 6, No. 4, published by Digital Equipment Corporation. This article describing array controllers is incorporated by reference into this application.

Figure 4:
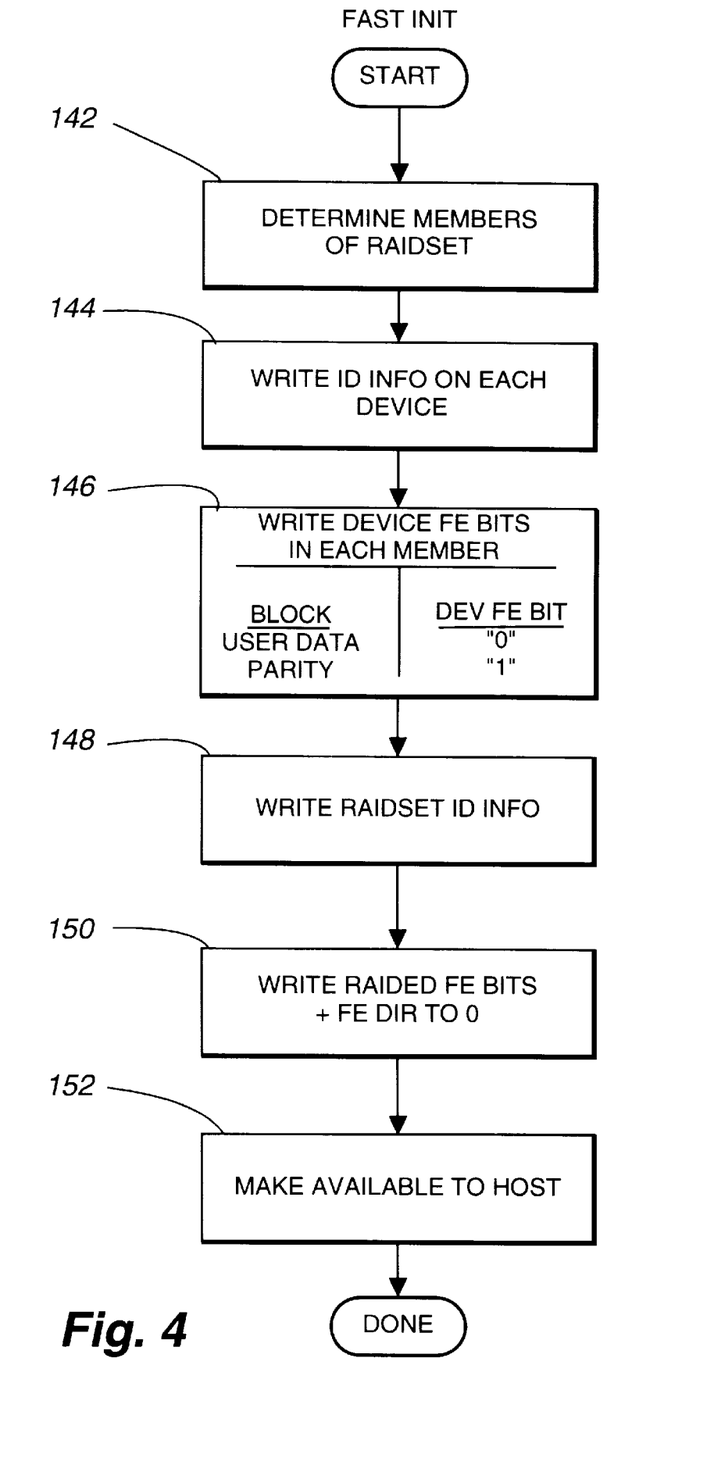
FIG. 4 shows the logical operation flow of a fast initialization process of a RAID array to provide the RAIDset metadata and device metadata in accordance with the invention.

To create or initialize the disk drive members of the RAIDset in accordance with this invention, the logical operations or processes performed by the controllers begin as shown in FIG. 4 with operation 142 determining the membership of the RAIDset. Using the example RAID array in FIG. 1, operation 142 would find disk drives A, B, C and D as the members of the RAIDset. Step 144 then writes the ID information in the device metadata (for example, Block 100 for drive A in FIG. 1) as previously discussed with reference to FIG. 1. After each disk drive has its device ID written, operation 146 writes all of the device FE bits for each member, i.e., each disk drive. Initially all of the parity blocks have their corresponding device FE bits set to 1. All of the user data blocks have their corresponding device FE bits cleared to 0. The process for setting an FE bit to 1 or clearing an FE bit to 0 and the corresponding setting or clearing operation on the FE Dir bits is described hereinafter with reference to FIGS. 5 and 6.

After the FE bits have been set or cleared by operation 146, operation 148 then writes the RAIDset ID information in the RAIDset metadata portion of the drives. As discussed earlier, the RAIDset ID information defines the members, or disk drives, in the RAIDset along with the user data blocks making up the RAIDset. In effect, the RAIDset ID information can be viewed as defining the virtual disk drive that is provided by the RAID array.

After step 148 writes the RAIDset ID information, operation 150 writes the RAIDset FE bits and FE Dir bits to 0. In effect step 150 clears the RAIDset FE bits. The process for clearing FE bits is described hereinafter in FIG. 6.

At this point, the initialization of the RAIDset is complete. The device metadata has its FE bits for parity blocks set to 1 to indicate that the blocks may not be used to reconstruct a sliver of data across the RAID members. This is acceptable for initialization as it is not known whether any data in the RAID sliver is meaningful anyway. Further, the device FE bits for the user data blocks have been cleared to 0 to indicate the corresponding user data block is consistent. This enables the controller to operate a reconstruct routine and at its own pace to clear the parity block FE bits to 0 as each sliver is reconstructed. This can be done as a background operation performed by the controller.

At the same time in the RAIDset, the RAIDset FE bits are written to 0 for each block of user data in the RAIDset. This merely indicates that the user data is trustworthy. The user data after initialization may be meaningless, but it is still important for the system to be able to read the user data blocks. Data in the user data blocks becomes meaningful as each user block is written. As will be described hereinafter, the foreground operation of writing user data into a block will also cause reconstruction of the parity block in the RAIDed sliver of blocks containing the written user data block.

After initialization is complete through step 150 in FIG. 4, the controller notifies the host CPUs that the virtual disk of the RAID system is on-line and available to the host. This operation is performed by step 152.

The combined operations in FIG. 4 are referred to as FAST INIT. FAST INIT is a fast initialization process achieved by writing only the device metadata and the RAIDset metadata. This can be accomplished very quickly as opposed to conventional initialization of a disk drive where the entire drive has all of its bits written to 0. For example, to initialize all the bits in the RAIDset of FIG. 1 to 0 would typically consume an hour. The FAST INIT process illustrated in FIG. 4 initializes the RAIDset in less than 2 minutes.

The initialization processes of the invention use a set FE Bit routine and a clear FE Bit routine. Both routines set and clear FE Dir bits as appropriate. These routines will now be described with reference to FIGS. 5 and 6.

Figure 5:
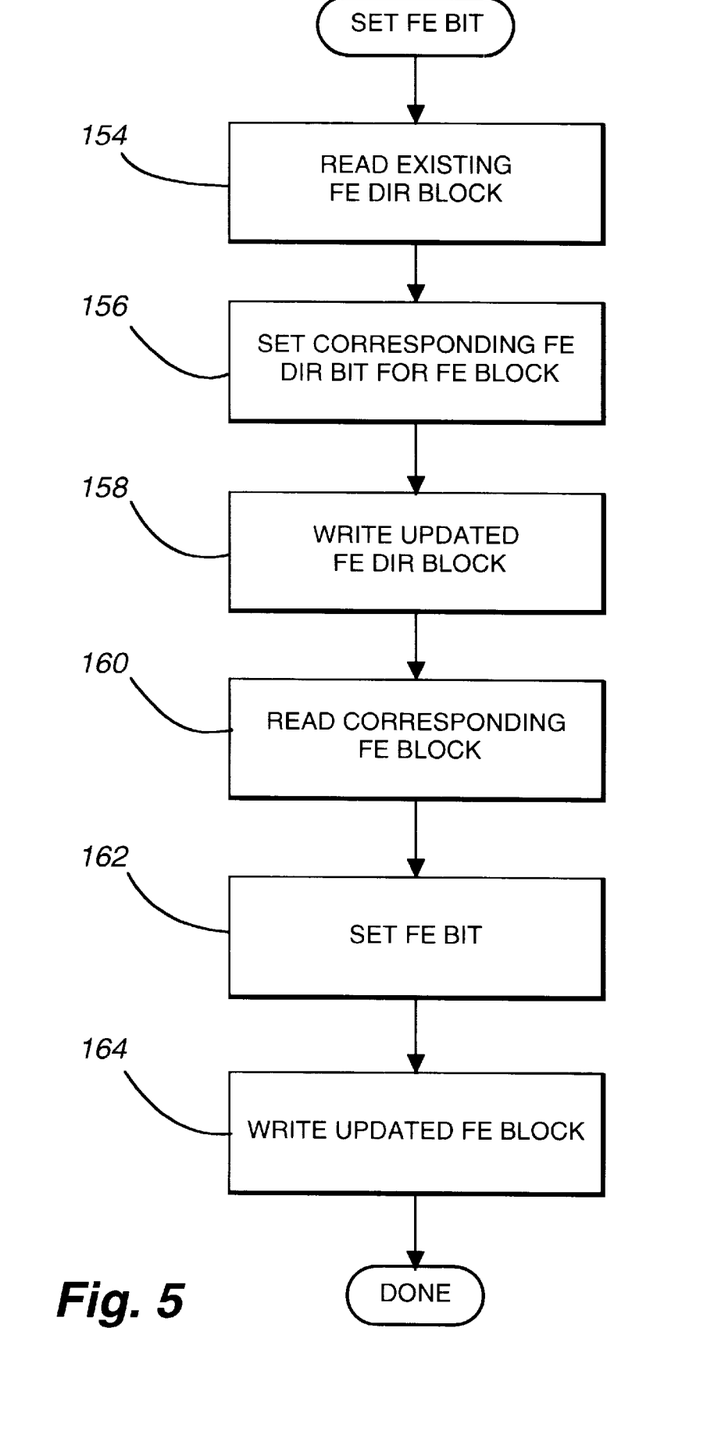
FIG. 5 shows the set FE Bit logical operation flow.

To set an FE bit to "1," the process in FIG. 5 begins with step 154 reading the existing FE Dir block containing the FE Dir bit associated with the FE bit block containing the FE bit that is being set. The FE Dir block is read from storage device to controller memory. After step 154 reads the FE Dir block into the controller memory space, operation 156 sets the FE Dir bit for the FE bit block to "1." Step 158 then writes the updated FE Dir block back to the storage device, i.e., disk drive.

The setting of an FE bit by first setting its corresponding FE Dir bit rather than first setting the FE Bit is a fail safe mode of operation. When checking for FE bits that have been set, the controller always checks the FE Dir bits first. This saves search time since an FE Dir bit represents a block of FE Bits. If the storage device were to go down between setting the FE Dir bit and setting the FE bit, the setting of the FE Dir bit would be a flag to the system that one or more of the FE bits in the corresponding FE block for the FE Dir bit may be set to "1."

Once the FE Dir bit has been set, step 160 reads the existing FE bit block from the storage device to controller memory space. Operation 162 then sets the FE bit in the FE bit block to "1." After the FE bit is set, operation 164 writes the updated FE bit block back to the storage device. This completes the "set FE bit" process.

Figure 6:
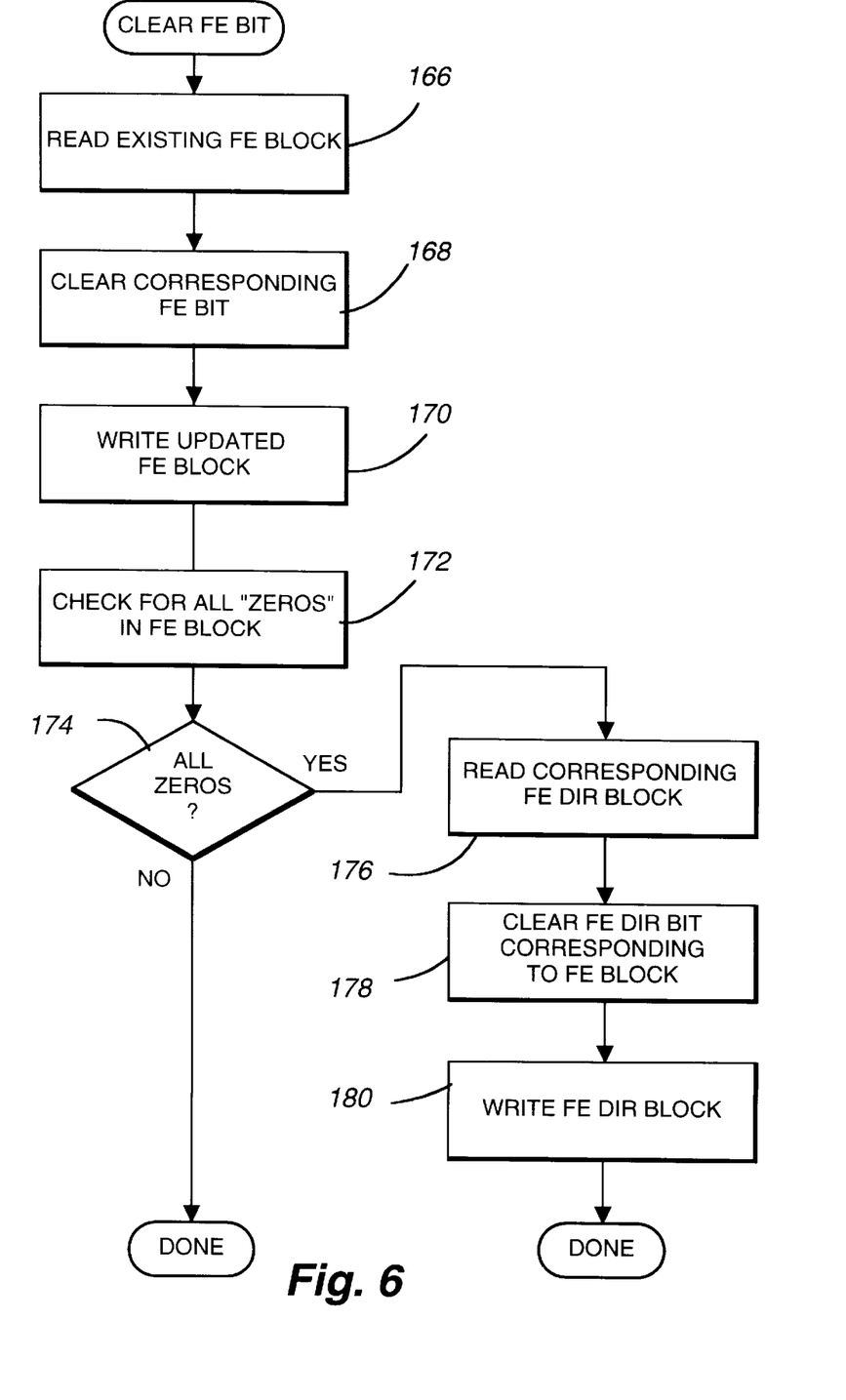
FIG. 6 shows the clear FE Bit logical operation flow.

To clear an FE bit to "0," the process in FIG. 6 begins with step 166 reading the existing FE bit block from the disk drive to the controller memory space. Operation 168 then clears the FE bit to "0" in memory space, and operation 170 writes the updated FE bit block back to the disk drive. Step 172 also reads the updated FE bit block from memory space to check if all the FE bits are "0." Decision operation 174 branches Yes, if the FE bit block is all zeros, to operation 176. Step 176 reads the corresponding FE Dir bit block that contains the FE Dir bit for the FE bit block whose FE bit was changed. The FE Dir bit block is loaded into controller memory space, and step 178 clears the FE Dir bit for the FE bit block to "0." After the FE Dir bit is cleared, operation 180 writes the FE Dir bit block back to the disk drive.

In the "clear FE bit" operation the, FE bit is cleared first, and then the FE Dir bit is cleared. Again, this sequence may result in an FE dir bit set when none of the FE bits in the corresponding FE block are set if the controller should crash in the middle of the sequence.

Another initialization of a disk drive to provide metadata as used in the invention occurs when a member disk drive in the RAIDset fails. The failed drive is removed from the RAIDset and replaced by a new disk drive. The process of initialization during this replacement is shown in FIG. 7.

Figure 7:
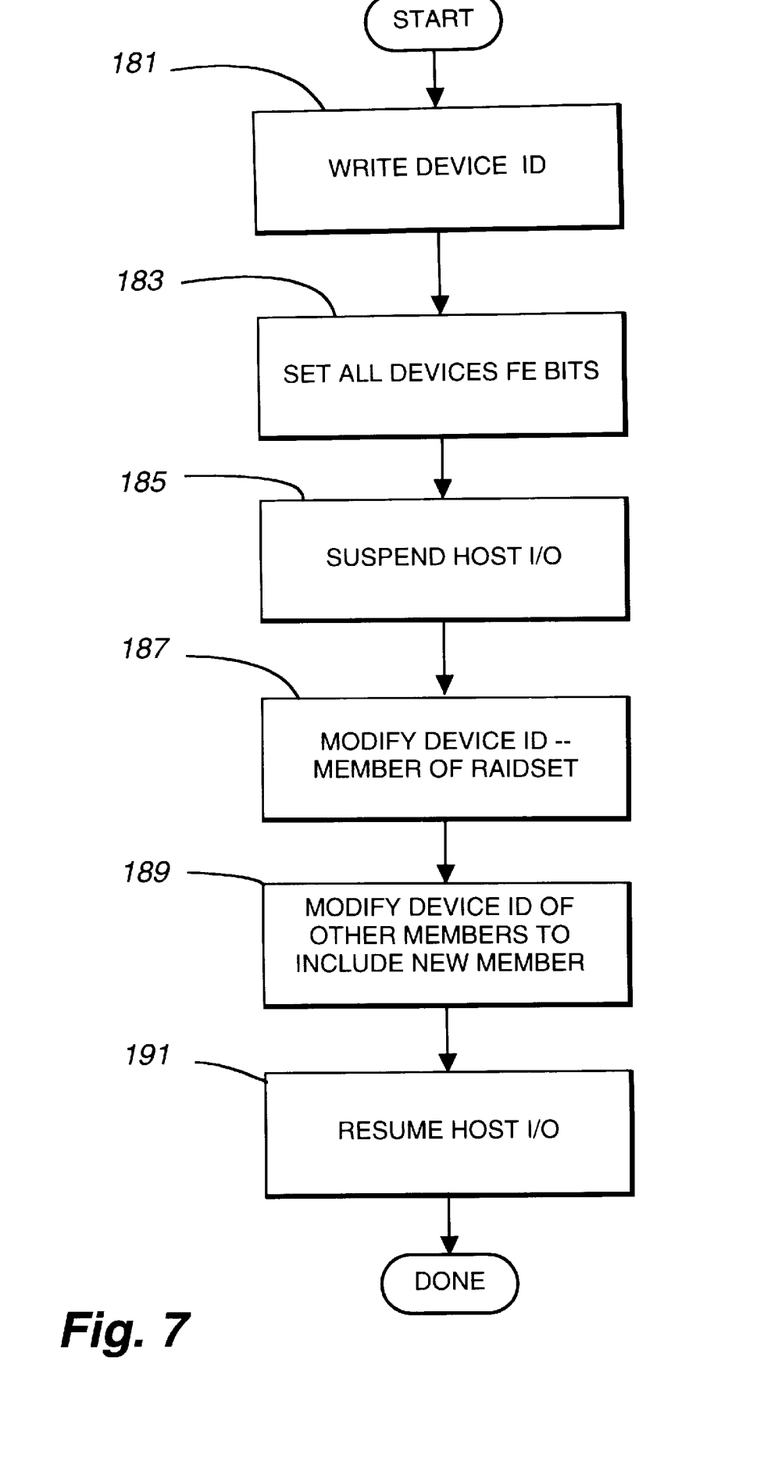
FIG. 7 shows the initialization process of a spare member for the RAID array and the process for updating the members of the RAID array when a failed member is replaced by the spare member.

Replacement initialization in FIG. 7 begins at step 181 which writes the device ID in the new disk drive. In particular, step 181 writes an identifier that marks the new disk drive as a spare available for insertion in a RAIDset. After operation 181, operation 183 sets all the device FE bits and corresponding FE Dir bits to 1. Operations 181 and 183 are normally performed before the replacement member is installed in the RAIDset. Alternatively, they could be done at the time of installation.

After step 183, host I/O is suspended by step 185 so that the RAIDset membership may be updated. In operation 187, the new member has its device ID modified to identify the RAIDset and the members of the RAIDset that the new disk drive has been inserted into. Next, operation 189 modifies the device ID of each of the other members in the RAIDset to include the new member as a replacement for the failed member. With all of the device IDs updated to reflect the new member in the RAIDset, operation 191 resumes host I/O operations. By this process in FIG. 7, a new member is inserted in the RAIDset with all of the device FE bits in the new member set to 1.

Figure 8:
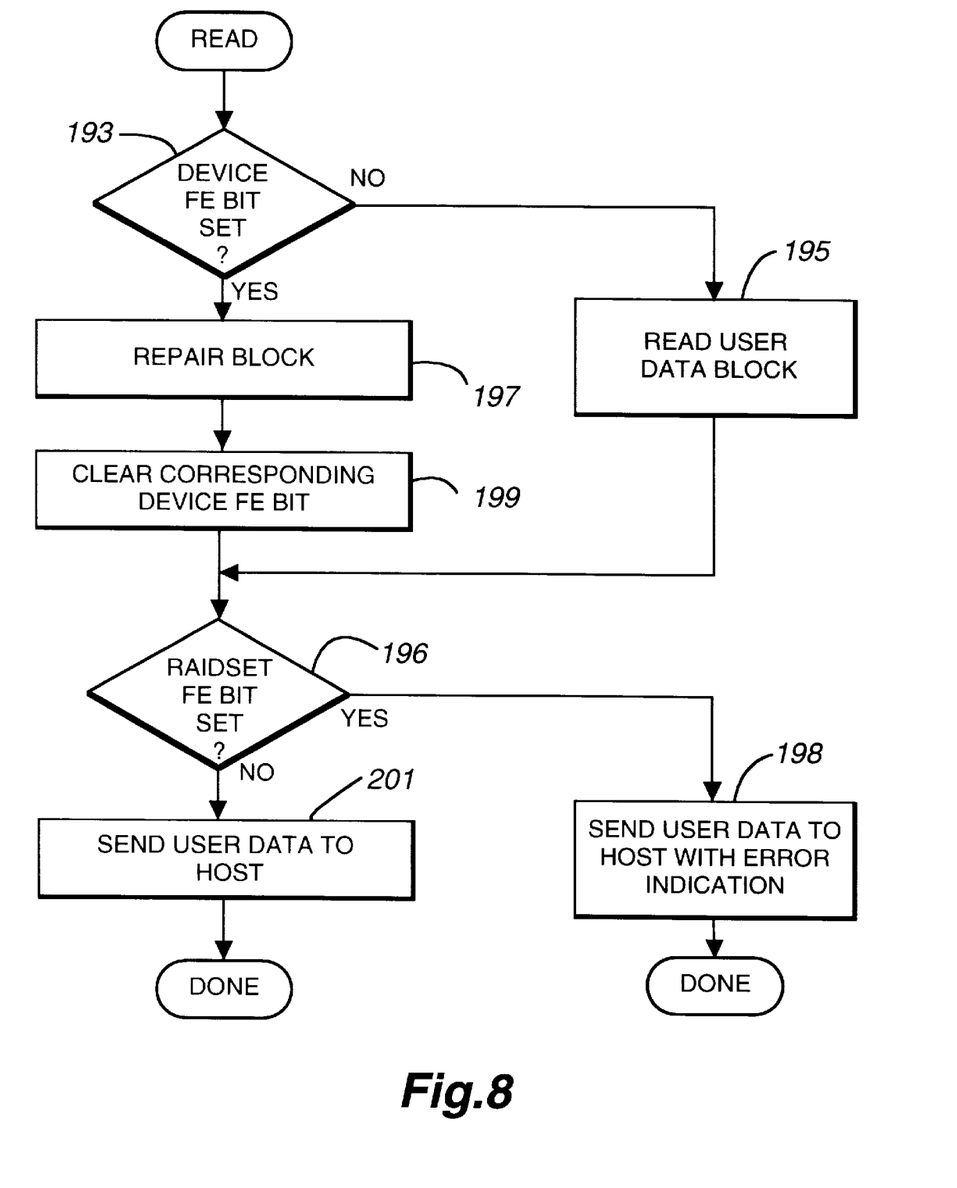
FIG. 8 shows the user data read process for a RAID array using the RAIDset metadata and device metadata of the present invention.

In FIG. 8, a read process in a RAID array using the invention is illustrated. The read process makes use of the device FE bits to repair a block whose device FE bit has been set. The read process begins at decision operation 193 which tests for whether the user data block being read has its device FE bit set. If it is not set, the process branches to operation 195. Operation 195 reads the user data block.

If the device FE bit is set, the process branches "Yes" to repair block operation 197. The repair block operation is described in detail hereinafter with reference to FIG. 9. Briefly, the repair block operation uses consistency of the RAID protected sliver of blocks to regenerate the user data in the block and thereby reconstruct that user data block on the disk drive. After operation 197, step 199 clears the device FE bit corresponding to the user data block just repaired.

After user data has been read in operation 195 or repaired in operation 197, decision operation 196 detects whether the RAIDset FE bit is set. If the RAIDset FE bit is set, the user data block read in step 195 is not trustworthy. Therefore, operation 198 sends the user data to the host with an error indication. If the RAIDset FE bit is not set, step 201 sends the user data to the host as valid data.

Figure 9:
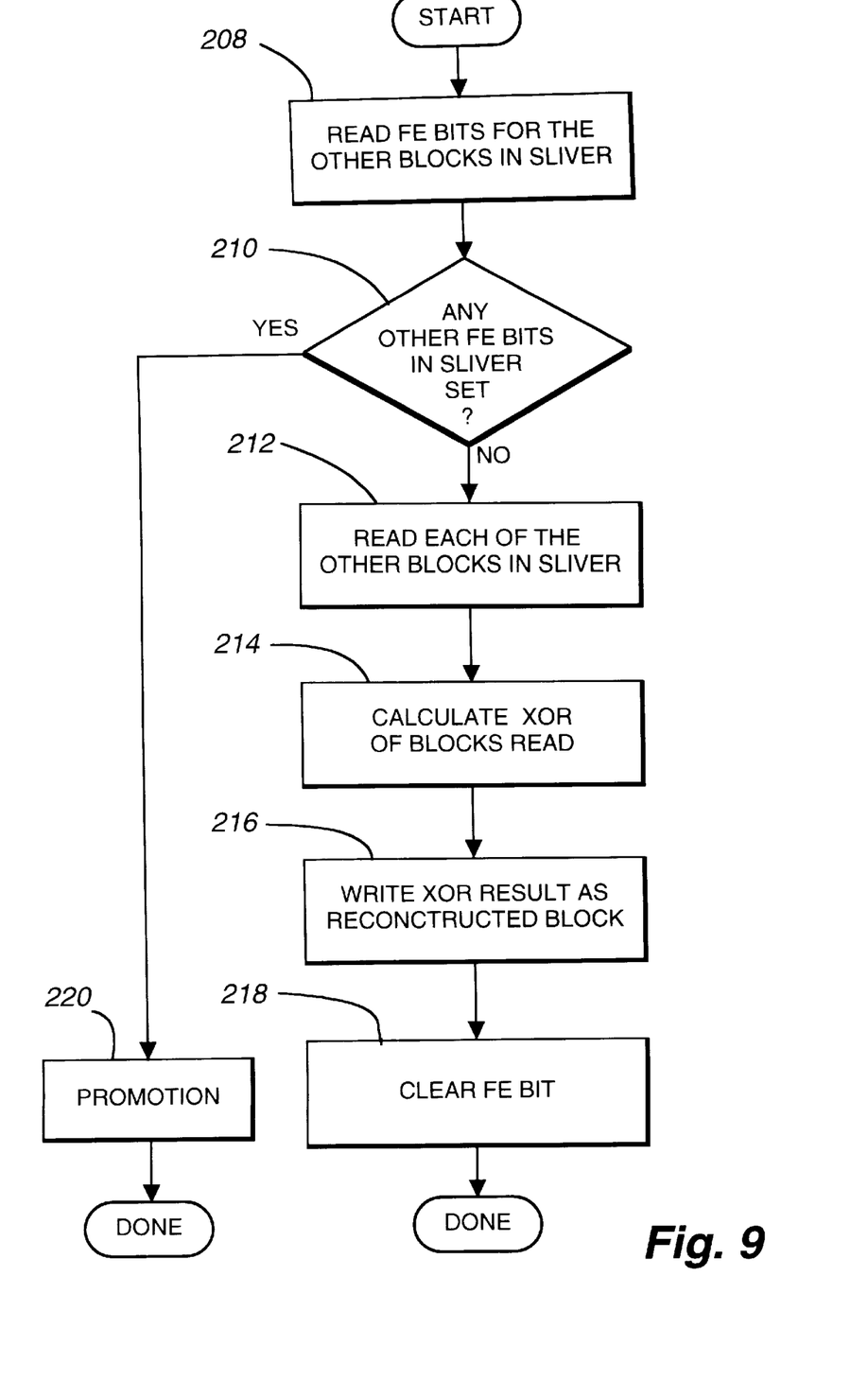
FIG. 9 shows the repair process for bad data blocks using RAIDset metadata and device metadata of the present invention.

The repair process begins with operation 208 in FIG. 9. Operation 208 reads the FE bits for the other blocks in the sliver. This is done to detect whether any of the blocks, whose data will be used to repair the bad block, have been marked as inconsistent, i.e. unusable for RAID repair. Decision operation 210 tests for any other set FE bits in the sliver and if none are detected, branches the repair process to operation 212. Operation 212 reads the data from each of the other blocks in the sliver, and operation 214 calculates the XOR (exclusive Or) of the blocks just read by operation 212. The result of the XOR calculation is the regenerated data for the reconstructed block of data for the block corresponding to the FE bit that was set to "1." Operation 216 writes the reconstructed block back to the storage device. After the block is reconstructed, step 218 clears the FE bit (FIG. 6) to "0," and the repair process is complete.

If decision operation 210 detects that more than one block in the sliver has a device FE bit set, the repair process branches "Yes" to the promotion module 220. The promotion process restores consistency but can not reconstruct a block if more than one block in a sliver is marked as inconsistent. After promotion, the repair process is again complete. The promotion process is described in cross-referenced application entitled PROMOTING DEVICE LEVEL ERROR TO RAIDSET LEVEL ERROR TO RESTORE REDUNDANCY IN A RAID ARRAY DATA STORAGE SYSTEM, Attorney Docket No. U.S. patent application Ser. No. 08/542,933 filed Oct. 13, 1995, referenced above in the Cross-Reference section.

Figure 10:
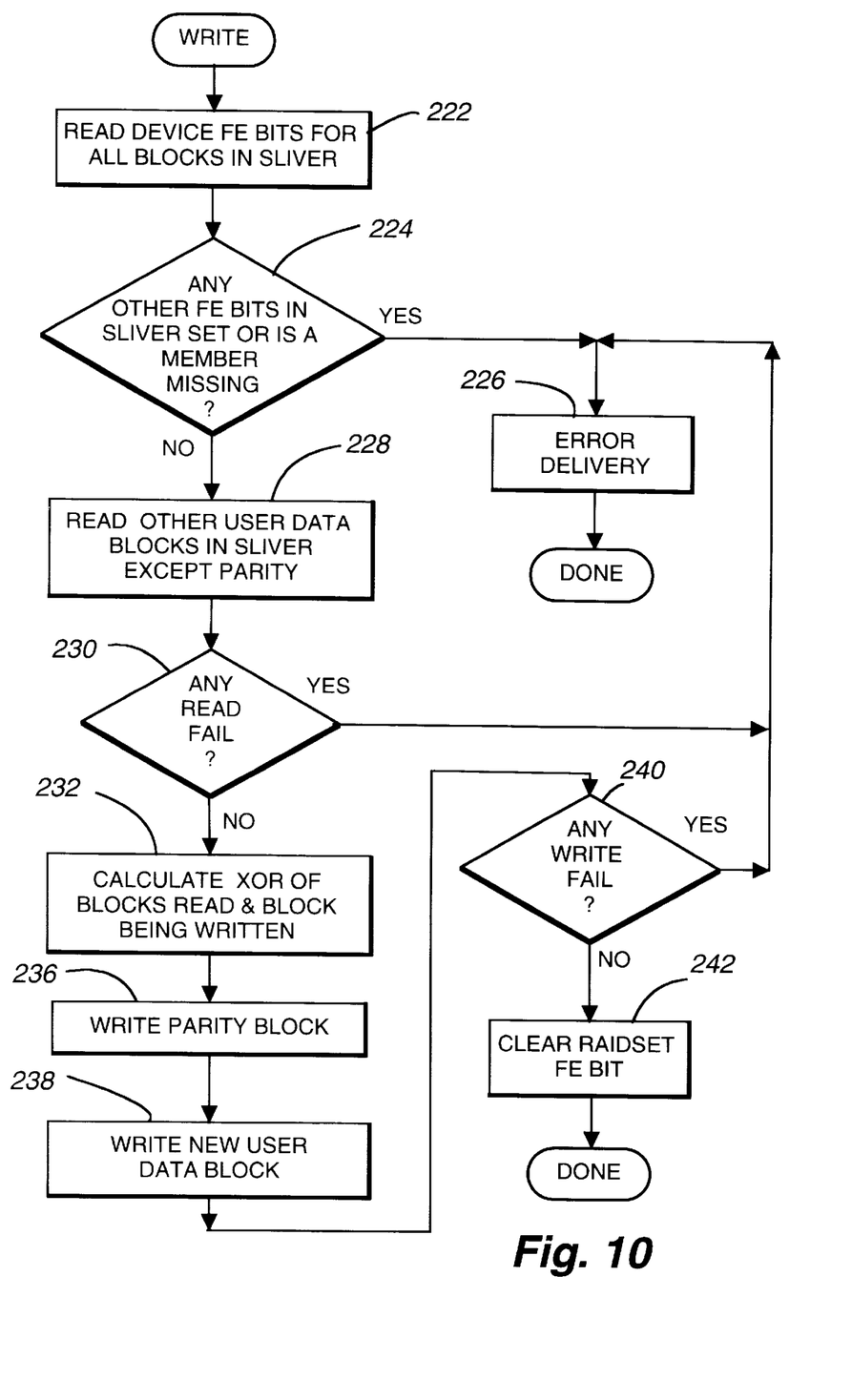
FIG. 10 shows the user data write process for a RAID array using the RAIDset metadata and device metadata of the present invention.

A write process using the metadata of the invention is illustrated in FIG. 10. Operation 222 reads the device FE bits for the other blocks in the sliver. This is done to detect whether any of the blocks, whose data will be used to generate the parity block, have been marked as inconsistent. Decision operation 224 tests whether any other device FE bits corresponding to blocks in the sliver have been set and also detects if a member of the RAID array is missing, i.e.

has crashed and needs replacement. If the answer is "Yes" to either condition, the process branches to the error recovery operation 226. If the answer is "No" to both conditions, operation 228 reads the data from each of the other user data blocks in the sliver but not the parity block.

Decision operation 230 tests whether any of the read operations performed by step 228 failed. If a read operation did fail in step 228, error recovery process is called. If the read operations were successful, operation 232 calculates the XOR (exclusive Or) of the data in the blocks just read by operation 228 and the data in the new block being written. The result of the XOR calculation is the updated parity block data. Step 236 writes the updated parity block for the sliver, and step 238 writes the new user data block in the sliver.

Decision operation 240 detects if either write operation 234 or 236 failed. If one or both of the write operations failed, the process branches to error recovery module 226. If the write operations were successful, step 242 clears the RAIDset FE bit to corresponding to the user data block just written to indicate the data in the block is valid.

While the invention has been particularly shown and described with reference to preferred embodiments thereof, it will be understood by those skilled in the art that various other changes in the form and details may be made therein without departing from the spirit and scope of the invention.

What is claimed is:

1. A method for formatting a RAID array of storage devices with device metadata for data blocks on each storage device and with RAIDset metadata for RAIDed blocks in the RAID array, the RAIDed blocks include data blocks and parity blocks and are RAID protected by being distributed across the RAID array of storage devices, said method comprising the steps of:

(A) writing as device metadata a device FE bit on each storage device for each RAIDed block on the storage device so that there is a one-to-one correspondence between each RAIDed block on the storage device and a device FE bit, said device FE bit indicating whether or not a corresponding RAIDed block is consistent and thereby indicating useability of the corresponding RAIDed block to reconstruct lost data in another RAIDed block; and (B) writing as RAIDset metadata a RAIDset FE bit for each RAIDed user data block in the RAID array so that there is a one-to-one correspondence between each RAIDed user data block in the RAID array and a RAIDset FE bit, said RAIDset FE bit indicating whether or not a corresponding RAIDed user data block contains true data.

2. The method of claim 1 wherein step (B) further comprises the step of:

(C) writing each RAIDset FE bit in RAIDed blocks in the RAID array whereby the RAIDset FE bits are RAID protected.

3. The method of claim 2 further comprising the steps of:

(D) writing as device metadata a device FE Dir bit for each block of device FE bits written by step (A) so that there is a one-to-one correspondence between each block of device FE bits on the storage device and a device FE Dir bit, said device FE Dir bit indicating whether or not any device FE bit in the corresponding block of device FE bits indicates a RAIDed block is inconsistent.

4. The method of claim 3 further comprising the steps of:

(E) writing as RAIDset metadata a RAIDset FE Dir bit for each block of RAIDset FE bits written by step (B) so that there is a one-to-one correspondence between each block of RAIDset FE bits in the RAID array and a RAIDset FE Dir bit, said RAIDset FE Dir bit indicating whether or not any RAIDset FE bit in the corresponding block of RAIDset FE bits indicates a RAIDed user data block is corrupted.

5. The method of claim 4 wherein step (E) further comprises the step of:

(F) writing each RAIDset FE Dir bit in RAIDed blocks in the RAID array whereby the RAIDset FE Dir bits are RAID protected.

6. The computer storage medium of claim 4 wherein step (E) of said computer process further comprises the step of:

(F) writing each RAIDset FE Dir bit in RAIDed blocks in the RAID array whereby the RAIDset FE Dir bits are RAID protected.

7. The RAID array of claim 3 wherein said RAIDset metadata further comprises:

a RAIDset FE Dir bit corresponding to each block of RAIDset FE bits, said RAIDset FE Dir bit indicating if any RAIDset FE bit in a corresponding block of RAIDset FE bits indicates a RAID protected user data block does not have valid data.

8. The RAID array of claim 7 wherein:

said RAIDset FE Dir bits are in RAID protected blocks in at least one RAIDset sliver having RAIDset FE Dir bit blocks and a parity block.

9. The method of claim 2 wherein step (A) further comprises the steps of:

(G) setting the device FE bit to a first state if the corresponding RAIDed block is not consistent; and (H) clearing the device FE bit to a second state if the corresponding RAIDed block is consistent.

10. The method of claim 9 wherein step (B) further comprises the steps of:

(I) setting the RAIDset FE bit to a first state if the corresponding RAIDed user data block is corrupted; and (J) clearing the RAIDset FE bit to a second state if the corresponding RAIDed user data block is true.

11. A method for initializing a RAID array with metadata, the RAID array having a plurality of members, each member being a disk drive, the metadata including device metadata for data blocks recorded on each member and RAIDset metadata for RAIDed (RAID protected) data blocks recorded across the members of the RAID array, the RAIDed data blocks include user data blocks and parity data blocks, said method comprising the steps of:

(A) writing device metadata on each member by:

(1) setting a device FE bit for a corresponding parity data block on the member to a first state, said first state indicating the corresponding parity data block can not be used to reconstruct a lost user data block in a RAIDed sliver of blocks across members of the array;

(2) clearing a device FE bit for a corresponding user data block to a second state, said second state indicating the corresponding user data block can be used to reconstruct another data block in a RAIDed sliver of blocks across members of the array;

(B) writing RAIDset metadata in RAIDed slivers of blocks across members of the array by clearing all RAIDset FE bits to a state indicating the user data blocks contain true data.

12. The method of claim 11 further comprising the steps of:

(C) writing device identification information on each member as part of the device metadata, said device identification information identifying the member, and other members in the RAIDset;

(D) writing RAIDset identification information in the RAIDset metadata, said RAIDset identification information identifying the RAIDset and all members of the RAIDset; and (E) indicating to a host computer connected to the RAIDset that the RAIDset is available for use.

13. A replacement method for replacing a member in a RAID array initialized in accordance with the method of claim 11, said replacement method comprising the steps of:

(F) writing the device identification in the new member, said device identification identifying the new member as a spare for the RAIDset;

(G) setting all the device FE bits in the new member to a first state indicating the blocks on the new member can not be used to reconstruct a data block on the member;

(H) suspending input/output operations to the RAID array by a host computer connected to the array;

(I) modify device identification of new member;

(J) modify device identification of other members in the RAID array;

(K) resume input/output operations to the RAID array by the host computer.

14. A RAID array of storage devices with user data blocks on each storage device RAID protected by being distributed as a slivers of blocks across the RAID array of storage devices, each sliver having a plurality of user data blocks and one parity block, said RAID array having metadata comprising:

device metadata having a device FE bit on each storage device corresponding to each RAID protected block on the storage device;

said device FE bit indicating if a corresponding RAID protected block is consistent and thereby useable to regenerate data in another RAID protected block in the corresponding RAID protected block's sliver;

RAIDset metadata having a RAIDset FE bit corresponding to each RAID protected user data block in the RAID array; and said RAIDset FE bit indicating whether or not a corresponding RAID protected user data block contains true data.

15. The RAID array of claim 14 wherein:

said RAIDset FE bits are in RAID protected blocks in at least one RAIDset sliver having RAIDset FE bit blocks and a parity block.

16. The RAID array of claim 15 wherein said device metadata further comprises:

a device FE Dir bit corresponding to each block of device FE bits, said device FE Dir bit indicating if any device FE bit in a corresponding block of device FE bits indicates a RAID protected block is inconsistent.

17. A computer program storage medium readable by computer system and encoding a program of instructions for executing a computer process in a RAID array controller, the RAID array having a plurality of RAID storage devices with user data blocks on each storage device RAID protected by being distributed as slivers of blocks across the RAID storage devices, each sliver having a plurality of user data blocks and one parity block, said computer compress for creating metadata on the RAID array and comprising the steps of:

(A) writing as device metadata a device FE bit on each storage device for each RAIDed block on the storage device so that there is a one-to-one correspondence between each RAIDed block on the storage device and a device FE bit, said device FE bit indicating whether or not a corresponding RAIDed block is consistent and thereby indicating useability of the corresponding RAIDed block to reconstruct lost data in another RAIDed block; and (B) writing as RAIDset metadata a RAIDset FE bit for each RAIDed user data block in the RAID array so that there is a one-to-one correspondence between each RAIDed user data block in the RAID array and a RAIDset FE bit, said RAIDset FE bit indicating whether or not a corresponding RAIDed user data block contains true data.

18. The computer program storage medium of claim 17 wherein step (B) of said computer process further comprises the step of:

(C) writing each RAIDset FE bit in RAIDed blocks in the RAID array whereby the RAIDset FE bits are RAID protected.

19. The computer program storage medium of claim 18 wherein said computer process further comprises the steps of:

(D) writing as device metadata a device FE Dir bit for each block of device FE bits written by step (A) so that there is a one-to-one correspondence between each block of device FE bits on the storage device and a device FE Dir bit, said device FE Dir bit indicating whether or not any device FE bit in the corresponding block of device FE bits indicates a RAIDed block is inconsistent.

20. The computer program storage medium of claim 19 wherein said computer process further comprises the steps of:

(E) writing as RAIDset metadata a RAIDset FE Dir bit for each block of RAIDset FE bits written by step (B) so that there is a one-to-one correspondence between each block of RAIDset FE bits in the RAID array and a RAIDset FE Dir bit, said RAIDset FE Dir bit indicating whether or not any RAIDset FE bit in the corresponding block of RAIDset FE bits indicates a RAIDed user data block is corrupted.

* * * * *

UNITED STATES PATENT AND TRADEMARK OFFICE
CERTIFICATE OF CORRECTION

PATENT NO: 6,161,192

DATED: December 12, 2000

INVENTOR(S): Lubbers et al.

It is certified that error appears in the above-identified patent and that said Letters Patent is hereby corrected as shown below:

Claim 17, line 9, "compress" should read --process--

Signed and Sealed this

Twenty-ninth Day of May, 2001

*Attest:*

NICHOLAS P. GODICI

*Attesting Officer*     *Acting Director of the United States Patent and Trademark Office*